(12) United States Patent
Henderson

(10) Patent No.: US 6,901,266 B2
(45) Date of Patent: May 31, 2005

(54) METHOD AND APPARATUS FOR AN IMPROVED CALL INTERRUPT FEATURE IN A CORDLESS TELEPHONE ANSWERING DEVICE

(76) Inventor: Daniel A. Henderson, 209 Oakhill Dr., Trophy Club, TX (US) 76268

( * ) Notice: Subject to any disclaimer, the term of this patent is extended or adjusted under 35 U.S.C. 154(b) by 0 days.

(21) Appl. No.: 10/430,482

(22) Filed: May 6, 2003

(65) Prior Publication Data

US 2003/0216148 A1 Nov. 20, 2003

Related U.S. Application Data

(62) Division of application No. 09/160,737, filed on Sep. 25, 1998, now Pat. No. 6,611,681.
(60) Provisional application No. 60/060,150, filed on Sep. 26, 1997.

(51) Int. Cl.$^7$ ................................................ H04B 7/15
(52) U.S. Cl. .................... 455/462; 455/412.1; 455/567; 379/88.12; 379/88.18; 379/88.19
(58) Field of Search ............................. 455/462, 412.1, 455/412.2, 413, 563, 414.1; 379/567, 164, 88.11, 88.12, 88.18, 88.19, 88.21

(56) References Cited

U.S. PATENT DOCUMENTS

| | | | | |
|---|---|---|---|---|
| 4,365,117 A | * | 12/1982 | Curtis ......................... | 379/393 |
| 5,657,372 A | * | 8/1997 | Ahlberg et al. ......... | 455/567 X |
| 5,754,627 A | * | 5/1998 | Butler et al. ............. | 455/414.1 |
| 5,953,656 A | * | 9/1999 | Bertocci ................... | 455/412.2 |
| 6,018,671 A | * | 1/2000 | Bremer ..................... | 379/164 X |
| 6,611,681 B2 | * | 8/2003 | Henderson ................. | 455/413 |

* cited by examiner

Primary Examiner—Nay Maung
Assistant Examiner—Philip J. Sobutka
(74) Attorney, Agent, or Firm—Richard K Robinson

(57) ABSTRACT

A telecommunication device comprising a base unit and a cordless handset, wherein said telecommunication device is operable in a plurality of modes of operation. The base unit includes: (1) a ring signal detection module communicatively coupled to a telephone network; (2) a voice communication channel also communicatively coupled to said telephone network; (3) a wireless communication transmitter module; (4) a wireless receiver module; and (5) a controller for executing program instructions. The cordless handset includes: (1) a ringer module; (2) an ear piece; (3) a microphone; (4) a talk request command input device; (5) a wireless communication transmitter; and (6) a wireless communication receiver. The modes of operation include a talk request mode of operation, wherein (1) a ringing signal is received at said base unit; (2) said base unit transmits a wireless signal to said cordless handset; (3) said cordless handset receives said wireless signal; from said base, and initiates said local ringer module; (4) said base unit counts a predetermined number of rings; (5) said base unit initiates an off-hook condition in response to detection of a predetermined number of rings; (6) an outgoing message (OGM) is played at said base unit; (7) actuation of said talk request command input device is detected; (8) said base unit receives a wireless talk request signal (TRS) from said cordless handset, initiates an OGM end detection means, and continues to play said OGM; and (9) upon detection of end of said OGM by said OGM end detection means, said base unit inhibits the start of an incoming message (ICM) means and connects the calling party with the called party at said cordless handset.

12 Claims, 2 Drawing Sheets

METHOD AND APPARATUS FOR AN IMPROVED CALL INTERRUPT FEATURE IN A CORDLESS TELEPHONE ANSWERING DEVICE

CLAIM OF PRIORITY TO PROVISIONAL APPLICATION

This application is a division of application Ser. No. 09/160,737, filed Sep. 25, 1998, now U.S. Pat. No. 6,611,681.

This application claims priority under 35 USC § 119 to the following U.S. provisional patent application: patent application Ser. No. 60/060,150, filed by inventor Daniel A. Henderson on Sep. 26, 1997, which is entitled "Method and Apparatus for Improved Call Interrupt Feature in Cordless TAD."

BACKGROUND OF THE INVENTION

1. Field of the Invention

The present invention relates in general to wireless information communication systems, and in particular to cordless telephones with integral telephone answering devices (TADs).

2. Description of the Prior Art

The present invention relates to telephone answering machines, but also to telephone functions now commonly available in personal computers equipped with voice/fax modems.

Heretofore, telephone answering devices and other voice messaging solutions, including computer implemented voice mail functions (hereinafter collectively referred to as "TAD"), could be answered by someone other than the intended called party. In other words, when a calling party attempting to reach a called party called the TAD, some other person could inadvertently pick up the telephone during the outgoing message (OGM) and interrupted the message recording process. Typically, the OGM would be interrupted so that the calling party and the answering party could speak to one another immediately without the noise and inconvenience of the OGM playing over their conversation, such as seen in US RE 33,507 issued to Hashimoto for cordless TADs or other methods related to conventional corded TADs such as seen in U.S. Pat. No. 4,451,707 issued to Hanscom. However, this was inconvenient for both the party answering the called parties' line and also inconvenient for the calling party, for a number of reasons.

In one case, the answering party would be then required to manually take a message from the calling party, which may lead to inaccuracies in the message being conveyed to the called party because of errors by the answering party in transcribing the message or due to message complexity. In another case, the calling party would then have to call the TAD again in order to record a complete message, in hopes that the call would not be again answered by the wrong person. Or in the case where the answering party returned the telephone to an on-hook condition in an attempt to return control to the TAD for message handling, the on-hook condition would be detected and the calling party would be disconnected from the TAD. Another problem occurs when the proper called party answers the telephone and interrupts the message handling of the TAD and does not have time to talk to the calling party.

In an attempt to alleviate the problem, Hashimoto U.S. Pat. No. 5,138,652 teaches the use of a line monitoring circuit that detects an initial off-hook condition by the answering party and measures a predetermined period of time (for example, 3 seconds) to see if an on-hook condition occurs within the predetermined period of time. The line monitoring circuit detects that the telephone has been taken off-hook by the answering party (as opposed to the intended called party) in response to the incoming call. Then, a timer is started to monitor for a subsequent detection of an on-hook condition by the answering party after it is discovered the call was answered in error. If the on-hook condition occurs within the predetermined time period, the TAD is then allowed to continue in completing the message process and a message from the calling party is recorded on tape or digital memory such as a memory IC or analog tape. The problem with this approach is that in the event the answering party takes longer than the predetermined time period to return the telephone to an on-hook condition, the TAD cannot be returned to take control of the message process.

SUMMARY OF THE INVENTION

In order to solve the foregoing problems, an objective of the present invention is to provide a means for allowing an improved call intercept function in which the control of the message handling function by the TAD can be reestablished without dependence upon a predetermined time period after an off-hook condition has occurred.

It is a further objective of the invention to allow for a specific predetermined DTMF or voice signal or command to be received by the TAD from either the calling party, or the answering party, after an off-hook condition so that message handling may be returned to the TAD to record a message after an on-hook condition.

It is also an objective of the invention to allow any general DTMF signal to be depressed from an extension or cordless telephone which will allow the answering party who may not be familiar with specific codes for the called party TAD to reestablish call control to the TAD prior to placing the telephone in an off-hook condition.

IMPROVED CALL INTERRUPT FEATURE: It is one objective of the present invention to provide an improved method and apparatus for an improved call interrupt feature in cordless TAD, in the preferred embodiment, consisting of the following steps:

(1) a ringing signal is received at a base unit.

(2) the base unit transmits a wireless signal to a cordless handset.

(3) the cordless handset receives the wireless signal from the base, and initiates a local ringer.

(4) the base unit TAD counts a predetermined number of rings.

(5) the base unit TAD initiates an off-hook condition in response to detection of a predetermined number of rings.

(6) the OGM is played at the base unit TAD.

(7) the called party presses the "TALK" button in response to ringing signal, but after the OGM has started.

(8) the base unit receives a wireless talk request signal (TRS) from cordless handset, initiates an OGM end detection means, and continues to play the OGM for the calling party.

(9) upon detection of end of the OGM by OGM end detection means, the base unit inhibits the start of the ICM means and connects the calling party with the called party at the cordless handset.

TALK REQUEST CONFIRMATION: In a first alternative embodiment, in response to Step (7) above, and simultaneous with the continuation of the OGM played separately for the calling party, the base unit transmits a wireless signal back to the called party at the cordless handset (hereafter known as a "Talk Request Confirmation Signal" or TRCS) to verify receipt of the Talk request by the base unit. Such a TRCS means could be a voice annunciation such as "Please hold, you will be connected shortly", generated by a synthesized voice from the base unit, or a display of a predefined message on a display at the cordless handset.

The TRCS signaling means created at the base unit could be comprised of a synthesized voice that also incorporated caller ID data received between the ringing signals at the base unit in the conventional manner that was then synthesized and included in the talk request response signal to be sent back to the cordless handset. In this example, a called party might hear, "You will be connected with John Doe calling from 555-1212".

Finally, a music on hold version of the TRCS signal, or some other TRCS alerting means, such as a textual display, could be transmitted from the base unit to the cordless handset until the OGM end detection means detected the end of the OGM. Then, the calling party and the called party would be connected and a voice communication could occur.

Alternatively, in response to a digital or analog TRCS transmitted from the base unit to the cordless handset, a vibration, light signal, audible response, or textual display could be generated for the called party by an alert generation means housed within the cordless handset.

In any case, the TRCS announcement means could be heard by the called party in response to a talk request from the called party that is generated by a signaling generator contained within the cordless handset, or by a signaling generator contained within the base unit. The talk request confirmation could be heard by the called party at the cordless handset up until conclusion of the OGM. The called party would then know that he or she would be connected immediately after conclusion of the OGM, or the TRCS could be immediately interrupted should the OGM conclude prior to conclusion of the TRCS.

HANG-UP DETECTION: Should the calling party hang up prior to conclusion of the OGM, some means of detecting that the calling party was no longer on the line at the base unit would allow the called party to immediately know the calling party had disconnected. This could be accomplished in a number of ways. For example, upon detection of the calling party terminating the call at the base unit, the base unit could be placed in an on-hook condition and a termination signal could then be sent to the cordless handset, which would notify the called party that there is no longer a calling party on line. In another embodiment, a signal could be sent from the base unit to the cordless handset in response to calling party termination of the call that would automatically place the handset in an on-hook condition for the calling party. An optional termination signal, such as a particular ringing signal or voice annunciation could accompany the on-hook condition at the cordless handset to inform the called party of the situation, such as a peculiar cadence or frequency of the ringing signal or a synthesized voice annunciation such as "The calling party has disconnected". Finally, in another alternative embodiment, a special signal could be received by the called party at the cordless handset, generated by a signal generator contained within the base unit that is responsive to termination of the call by the calling party, that would transmit a particular signal from the base station to the cordless handset, indicating to the called party that the calling party has disconnected.

CONVERSATION RECORDING: Alternatively, in response to a conversation recording switch means contained in at least one of either the base unit, or a conversation recording switch means contained in the cordless handset, the ICM means in the base unit would not be turned off at the conclusion of the OGM in response to receipt at the base unit of a "Talk" request. If the called party placed the conversation recording switch means previously described to a conversation recording mode prior to or concurrent with receipt of an incoming call, then the ICM means would be made operable and the conversation would be recorded immediately after conclusion of the OGM and upon conversation between the calling and the called parties. Upon detection of an on-hook condition, or after detection for a predetermined time during which no voice signals were recorded, or in response to a change in the loop current at the base unit, or in response to an on-hook wireless signal received from the cordless handset at the base unit, or in some other means known to those skilled in the art, the ICM means would be stopped and made ready to record the next call.

RING CONTINUATION: In an alternative embodiment, the conversation recording means at the base unit could be actuated automatically in response to particular called party preferences stored in advance at the base unit and compared against caller ID data received in the conventional manner. If a particular calling party had previously been registered by a called party in a memory means within the base unit, and a comparator within the base unit determined a match between the prestored calling party data and caller ID data received, then the conversation recording means could be immediately initiated in response to the called party establishing communication by placing a talk request. The conversation recording means could be initiated and made ready to record a conversation anytime after receipt of caller ID data and prior to establishment of conversation between the calling party and the called party. In particular, even should the called party initiate a talk request after the start of the OGM, the automatic actuation of the conversation recording means could occur. This improvement has the advantage of eliminating the need for a manual conversation recording operation switch. In the prior art systems, it would be easy for a called communicant to forget to turn on the conversation recording means, which may typically be turned off by default or was only located at the base station.

In another alternative embodiment, the ringing signal in the handset would continue to ring after initiation by Step (2) above until such time as the OGM is concluded as determined by Step (9) above. Then, upon receipt from the base unit of an OGM end signal, the ringing signal generation means or other signaling means within the cordless handset would be stopped, and the base unit and the cordless handset would be connected for communication between the calling and the called parties. This way, the called party would be able to continue with the activity they were previously engaged for additional time prior to picking up the handset.

Alternatively, the ringing signal generation means in the cordless handset could be substituted with an audio confirmation generated by the cordless handset to be heard only by the called party, such as "Please wait". Upon detection of the end of the OGM, as in Step (9) above, communication would then be established prior to, during, or immediately after the initiation of the ICM means in the base unit.

Alternatively, the OGM heard by the calling party could be interrupted in response to a talk request received at the base unit and an alternative OGM, or other signaling means such as "The party you are trying to reach is now being connected, please wait", could be played for at least one of the calling and the called parties. Then, the base unit could automatically, or in response to a command by the calling or called party, connect the communicants. For example, at least one of the calling party and the called party could be instructed by a synthesized voice prompt generated by the base unit to press the Octothorpe key (#) to establish communication, such as "If you wish to now be connected, please press #". A suitable DTMF detector contained within the base unit could then receive the command key entered by a called or calling party, and cause the ICM means to be inhibited and a communication channel to be established immediately between the calling and called parties.

In this embodiment, the original OGM message generation means could continue to conclusion, albeit muted from the voice channel and calling party, and the substitute OGM described previously would be heard, instead, or the original OGM message generation means would be terminated and replaced with the substitute OGM.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
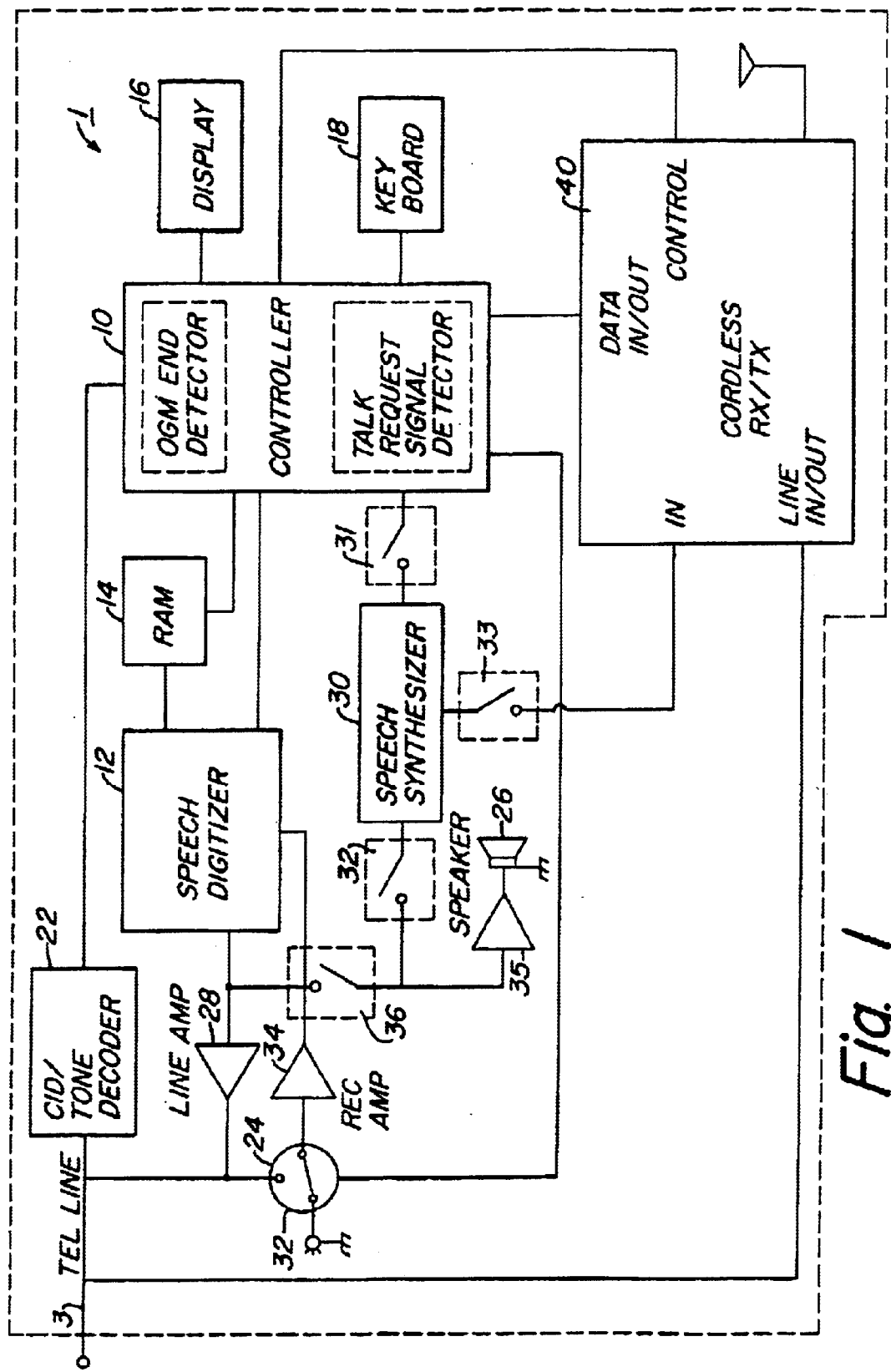
FIG. 1 is a block diagram showing the first embodiment of the present invention applied to the base unit of a telephone answering device and wireless telephone.
Figure 2:
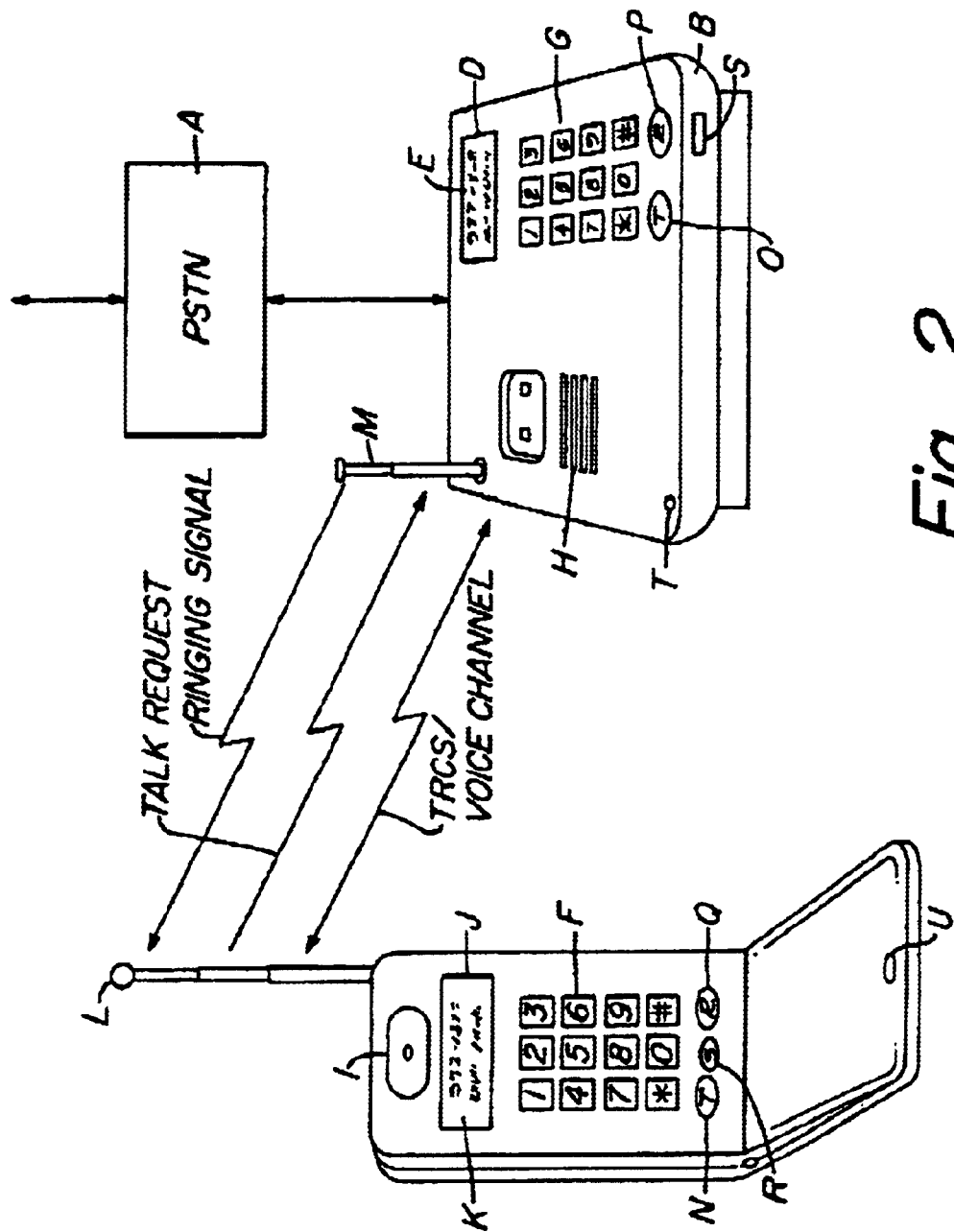
FIG. 2 is a pictorial representation of the overall operating of the TAD in accordance with one embodiment of the present invention.

FIG. 1 shows a basic circuit diagram of a base unit 1 in accordance with the present invention. The TAD of the present invention includes a base unit 1, which is connected to the telephone line 3 and a source of power (not shown) such as a wall socket. The telephone line 3 is connected to the line amplifier 28 so that messages may be transmitted to telephone line 3. The telephone line is also connected to the recording amp 34 through a switch 24 so that the recording amp 16 may be selectably connected to the telephone line 3 or the built-in microphone 32 by the controller 10.

The output of recording amp 34 is transmitted to the speech digitizer 12. The speech digitizer 12 is connected to, and controlled by, the controller 10. The speech digitizer 12 is also connected to RAM memory 14.

The speech digitizer 12 records audio signals in the RAM 14 by digitizing analog audio signals passed to it by the recording amp 34. The speech digitizer is also able to convert and play back digital signals stored in the RAM 14. The output from the speech digitizer 12 is transmitted to the line amp 28 and to speaker amp 30. In addition, the output from speech digitizer 12 may also be transferred to cordless RX/TX unit 40.

The output of line amp 28 is sent to the telephone line while the output of the speaker amp 35 is sent to a speaker 26. The output of the cordless TX/RX unit 40 is sent to a cordless telephone handset (not shown).

The CID/TONE decoder 22 is connected to controller 10 which may receive FSK (frequency shift keyed) caller id data when a ringing signal is received, as is well known in the art.

Caller ID data received by CID/TONE decoder 22 is transferred to controller 10. Controller 20 may transmit caller ID data to display 16 and also to speech synthesizer 30 which is connected to and controlled by controller 10. Audible human recognizable caller identifying data may then be heard from speaker 26.

SELECTIVE ANNUNCIATION OF CALLER IDENTIFYING DATA: Also shown are optional switches 31, 32, and 33 which may be controlled by controller 10. Alternately, switches 31, 32, 33 may be manual selection switches operable by the called party depending upon user preferences. It is not necessary for switches 31, 32, and 33 to be present as shown. For example, in one embodiment, only one switch may be utilized. In another embodiment, any two switches may be found. In yet another embodiment, no switches may be found at all.

Switches 31, 32 and 33 may be opened or closed by programming instructions contained in ROM in the controller 10 or by utilizing an attached sensor (not shown) which detects either (a) that a human being is near the base unit, or (b) that the cordless telephone handset is near the base unit. The sensor may be a mechanical sensor which detects when the handset is resting on the base unit or may be an infrared sensor which may detect the presence of a human being nearby, such as seen in U.S. Pat. No. 4,856,053. Alternatively, the sensor may detect sound or radio frequencies, or depression of an on-hook/off-hook switch in the portable telephone handset.

In the case where a proximity sensor is used in the base unit 1, the controller 10 can cause the audible caller identifying data to be heard from speaker 26 by closing switches 31 or 32 upon detection of a person or portable telephone handset being in proximity to the base unit. If a called party or portable telephone handset is not detected as being in physical proximity to the base unit, no audible announcement of caller identifying data is heard from speaker 26 because the switches 31 and 32 are in a normally open state.

To provide for additional functionality, intelligent proximity sensing could be employed wherein caller identifying data would not be announced or displayed unless a particular called party was found to be in proximity to the base unit.

This can be done by employing a uniquely encoded RF tag carried by the called party or incorporated in the portable telephone handset, voice recognition or other biometric meters, security codes, or some other means well known in the art. This novel method would prevent the identify of particular callers from being known to someone other than the intended recipient of the call, thereby protecting the confidentiality of the communication for the called party.

If the intelligent proximity sensor detected that a party other than the intended recipient of the call was in proximity to the base unit, switches 31 and 32 would be held in the normally open state and no announcement would be made of the caller identifying data. In addition, no display of caller identifying data would be available. If the intelligent proximity sensor detected that the intended recipient of the call was in proximity to the base unit, switches 31 or 32 would be closed and an announcement would be made of the caller identifying data through speaker 26. The functionality for intelligent call screening could be turned off by the called party by a switch means at the base unit (not shown).

Audible caller identifying data may be heard from the cordless telephone handset instead of from speaker 26. The controller 10 would cause speech synthesizer 30 and closure of switch 33 to transfer audible caller identifying data to Cordless RX/TX for transmission to the cordless telephone handset. This may occur as a result of determination by proximity sensor that the called party was not near the base unit, or in addition to such detection by default. The transmission of audible caller identifying data to the cordless telephone handset may alternatively occur only after detection by the controller 10 of a talk request signal received from the cordless RX/TX 40 as a result of the called party pressing the "talk" button at the cordless telephone handset.

In another embodiment where switches 31, 32 and 33 are manually operated instead of controllable by controller 10, controller 10 transfers data received from CID/tone decoder 22 to speech synthesizer 30 when manual switch 31 has been placed in a closed condition. In this example, audible sounds corresponding to caller id data received are generated from speaker amp 35 and speaker 26. Depending upon the position of switch 33 and 32, audible signals may also be transferred to Cordless RX/TX unit 40 for transmission to a cordless telephone handset (not shown in FIG. 1) for annunciation at the cordless telephone handset as in U.S. Pat. No. 5,646,979 issued to Knuth or to speaker amp 35 and speaker 26. Additionally, controller 22 may transfer digital or other analog data representative of textual caller identification data received from CID/tone decoder 22 to cordless RX/TX unit 40. Cordless RX/TX unit 40 then would transmit textual data to a cordless telephone handset for display and storage prior to, during, or after audible caller identifying data is heard at the cordless telephone handset.

Audible and/or visually displayable caller identifying data may be transmitted prior to, during, after, or in place of, a ringing signal heard at the cordless telephone handset. Audible or textual caller identifying data may be stored in RAM 14 in the base unit and/or in a suitable RAM in the cordless telephone handset for later display announcement and redial.

Alternately, cordless telephone handset may contain an integral speech synthesizer similar to that used in the base unit. Visually displayable caller id data received at the cordless telephone handset may be applied to the speech synthesizer to generate audible caller identification signals. The benefit of this approach is that only the caller identifying data must be transmitted to the cordless telephone handset. It is contemplated that, in this improvement, the audible caller identifying speech could then be heard either at the cordless telephone handset or at the base unit, depending upon the location of the called party, although it is not necessary that audible caller identifying speech must be only heard at one location or the other.

Switch 36 may be closed by controller 10 to allow stored caller identifying data to be announced to a called party when calling in for messages remotely from telephone line 3, as in U.S. Pat. No. 5,289,530 issued to Reese. Caller identifying data is stored in RAM 14 and may be associated with messages from calling parties, which are also stored in RAM 14. When a remotely called located called party calls in to check messages from the telephone line 3, he first enters a DTMF security code. Upon receipt of the proper code, the caller is informed that there are messages.

In the case where several calls have been received, but no associated voice message has been stored, the remote called party may be alerted to this condition by an announcement such as "four calls received—press * to hear an announcement of the caller id data." Therefore, upon hearing this information, the called party can immediately enter * to listen, or hang up and review the caller id data later at the office, thereby saving time and the cost of the call. In the case where some calls have caller identifying data associated voice messages and other calls have caller identifying data with no associated message, the called party may be alerted to this condition by an announcement such as "three messages, seven calls received total—press * to hear all call data, # to hear only message calls" or may be alerted to only the calls which have voice messages associated with the call.

In addition, an enhanced "toll saver" feature can be implemented in which the phone will ring once and then pick up if there are voice messages, ring twice and then pick up if there are caller id calls received by no associated voice messages, and ring three times if there are no messages or caller id received while the called party was away.

Controller 10 can attribute a different priority for remote replay to the calls received with an associated message than to the calls received with only caller id data. For example, the controller 10 could cause all message calls stored in RAM 14 with associated voice messages to be played first using speech synthesizer 12 (for the stored voice message) and speech synthesizer 30 (for the associated caller id data), line amp 28, and telephone line 3, and then cause all non-message calls (caller id only with no voice message) to be played only after completion of remote replay of message calls using speech synthesizer 30 (for caller id data), line amp 28 and telephone line 3. In both cases, message calls (caller id data and voice message) and non-message calls (caller id data with no voice message) would be audible transmitted to the called party remotely interrogating over the telephone line.

It is also recognized that previously received caller id data could be synthesized when first received from the CID/tone decoder, and stored as audible voice data in RAM 14 along with any associated voice message data. This would avoid having to apply the speech synthesizer again during remote retrieval of messages. In this case, speech synthesizer 30 would not be utilized when replaying data back to a remote called party over the telephone line.

As another example, the called party may only hear message calls with voice messages remotely, whereas other non-message calls with caller identifying data only would not be heard unless further requested by the called party by entering an additional command code, or only upon review locally by the called party at the base unit or the cordless telephone handset.

NON-STORAGE OF CID DATA BECAUSE OF CALL-IN FOR MESSAGES BY OWNER: Message data (voice message and caller id data) and non message data (caller id only data) is retrieved by controller 10 from RAM 14 in response to receipt of the proper DTMF code entered by the remotely located called party and decoded by the CID/tone decoder 22. Because the proper DTMF code has been entered by the caller, the controller can inhibit permanent storage of the caller identifying data from that call-in. In other words, the caller id data associated with the call-in from the remotely located called party may be erased from RAM 14, or inhibited from being stored in RAM 10 by the controller 10. Controller 10 could include a scratch pad memory for temporarily storing the received caller id data during call progress. Then, upon receipt of a proper DTMF access code, the controller can know to disable transfer of the received caller id data stored in scratch pad memory to RAM 14. This has the added advantage of conserving RAM for important incoming calls and saving time for the called party who would otherwise have to listen to caller id data associated with his call-in on subsequent calls to check for messages.

STORAGE OF ALTERNATE CALLER IDENTIFYING DATA BY THE CALLER: In the case where the calling party is calling from a telephone other than their normal telephone they are associated with (such as a pay phone or someone else's office), a voice announcement such as "You have reached Kazuo Hashimoto. I am out of the office now. Please leave a message at the tone. If you wish to review or change the caller id data sent with your call press the start button." If no command is received from the caller, a beep is generated and the caller may record their voice message. If the caller chooses to review their caller id data by depressing the * key, CID/tone decoder 22 receives the "*" command, and controller 10 causes switch 36 to be closed. The caller Id data received and stored in temporary memory or RAM is retrieved by the controller 10 and applied to speech synthesizer 30, line amp 28 and telephone lines 3 to be heard by the caller. Alternately, the caller id data has already been synthesized and temporarily stored by controller 10 and speech synthesizer 30 in RAM 14. In this case, the synthesized caller id data is retrieved by the controller 10 and sent to telephone line 3 by the speech digitizer 12. In any case, after sending the audible data corresponding to caller id received, the caller is instructed by voice message to verify or change the caller identifying data. The controller causes a voice instruction such as "depress the pound sign" if you wish to accept the caller id data you just heard or enter a telephone number you wish to be called back at. In addition, the caller may be instructed to say their name.

In any case, if the caller id data is acceptable to the caller, the "#" key will be decoded by the CID/tone decoder 22 and the controller 10 will cause the caller id data as received to be stored in permanent RAM 14 for association with a voice message from the caller. In the case where alternate caller identifying data is entered by the caller entering a new cal-back number, the CID/tone decoder 22 receives the telephone number data, an the controller replaces the caller id data temporarily stored with the new call-back number. In the case where the new caller identifying information comprises a spoken name, the controller detects the presence of speech signals and initiates the record amp and speech digitizer to store the voice data in RAM 14 to be associated with any voice message from the caller.

Alternately, in the case where the caller id data is blocked or unavailable as determined by the controller 10 and the CID/tone decoder 22, the outgoing message played to the caller can be altered to include "Your caller id is blocked or unavailable . . . please say your name or enter a call-back telephone number after the tone" after the base unit initiates an off-hook condition. After the caller has said their name or entered a telephone number, the remaining outgoing message can instruct the caller to leave a detailed voice message and then hang up.

In either case where the caller id data is blocked or out-of-area, or where the caller wishes to associate different data with the call than received from the caller id data, the substitute information entered by the caller may be stored in RAM 14 and associated with any subsequent voice message entered by the caller.

SELECTIVE ANNOUNCEMENT BASED ON PRE-STORED PREFERENCES: Another beneficial improvement has to do with selective annunciation of caller identification data that is based on preferences of the called party. In the above examples, all caller identification data is announced indiscriminate of the source of the call. This can be inconvenient to the called party who only desires to be interrupted by an audible announcement of particular callers, whereas other general callers may not merit the interruption of an announcement. For example, unsolicited sales calls to the called party may occur frequently and the called party may not wish to be interrupted with each audible announcement. However, an unexpected call from a dissatisfied customer or family member in an emergency may merit an announcement to the called party so that she can more readily prepare for the call. Therefore, needed is an improved method for selectively enabling the announcement of caller identifying data in a manner that is convenient for the called party.

Referring again to FIG. 1, hereafter is described an improved method of generating, or inhibiting, audible speech representative of caller identifying data. When a call is received at base unit, CID/tone decoder 22 decodes FSK data representative of the calling parties identity, time of call, or other information. This information is then transferred to the controller 10 as previously described.

Prior to receiving the call, the called party has entered telephone number, name, date, or time of call preferences or other information into RAM 14 utilizing keyboard 18 and controller 10, hereinafter referred to as caller preference data. This data comprises called party preferences for announcement of caller identifying data. Based upon a coincidence detected between the prestored data and caller identifying data received, a called party may hear announcement of callers based upon the identify of the caller, the time of the call, or some other criteria. Follows is a brief description of the improved method for announcement of caller id data.

Upon receipt of the controller 10 of caller identifying data from CID/tone decoder 22, a comparison is made against the pre-stored called party preferences in RAM 14. Conventional caller id service includes numeric data typically comprised of ten digit telephone number, alphanumeric data typically comprised of a name of the calling subscriber, and time and date data, the protocol of which is notoriously old in the art. Caller id data received and decoded FSK data by CID/tone decoder 22 is transferred to controller 10, which contains a coincidence detector (not shown). Controller refers to caller preference data entered by the called party which may be stored in RAM 14 or scratch pad memory in the controller 10, and compares the received caller id data with the caller preference data. If a coincidence is detected by controller 10 between data received and the caller preference data pre-stored in RAM 14 or scratch pad memory in controller 10, any of switches 31, 32, and 33 may be opened or closed by controller 10, thereby either enabling or disabling the announcement of caller identifying data to a called party. This has great advantage in application in that the owner of the device is relieved from frequent interruptions due to numerous caller identifying announcements. In addition, the improved invention provides enhanced call screening for a called party that provides greater flexibility to determine the time, the particular caller, or other criteria for causing call announcement to occur. Prior art systems were limited in that they only allowed for either all calls to be announced, or none of the calls to be announced.

What is claimed is:

1. A cordless telephone comprising:
    a base unit with an automatic telephone answering and recording subsystem;
    an outgoing message generator;
    a portable unit;
    wherein said base unit has a ring detection circuit to establish an off-hook condition upon receipt of an incoming call from a calling party and the outgoing message generator generates an outgoing message to the calling party at the establishment of the off-hook condition; and a talk request confirmation signal subsystem for automatically communicating predefined message to the portable unit, from the base unit, during the outgoing message in response to selection of a talk function by a called party utilizing said portable unit.

2. A cordless telephone according to claim 1, wherein said predefined message comprises a synthesized voice message.

3. A cordless telephone according to claim 1, wherein said predefined message comprises a textual message.

4. A cordless telephone according to claim 1, wherein said talk request confirmation signal subsystem includes means for providing an on-hold music signal to at least one of said called party and said calling party during a waiting interval prior to connecting said called party and said calling party.

5. A cordless telephone according to claim 1, wherein said base unit includes a means for detecting caller identification and the talk request confirmation signal subsystem automatically communicates a predefined message to said called party including caller identification information.

6. A cordless telephone according to claim 5, wherein said predefined message is presented to said called party in the form of an audible communication.

7. A cordless telephone according to claim 1, wherein said talk request confirmation signal subsystem includes means for automatically generating an alert signal in said portable unit to notify said called party that said outgoing message has been communicated to said calling party.

8. A cordless telephone according to claim 7, wherein said alert signal comprises one of:
   a vibration signal;
   a light signal;
   an audible response; and
   a text display.

9. A cordless telephone comprising:
   a base unit with an automatic telephone answering and recording subsystem;
   an outgoing message generator;
   a portable unit;
      wherein said base unit has a ring detection circuit to establish an off-hook condition upon receipt of an incoming call from a calling party and the outgoing message generator generates an outgoing message to the calling party, at the establishment of the off-hook condition; and
   an off-hook detection and termination signal generation subsystem for communicating a termination signal to the portable unit, from the base unit, upon detection of the calling party returning to an on-hook condition.

10. A cordless telephone according to claim 9, wherein said termination signal comprises at least one of:
   a particular ringing signal; and
   a voice annunciation.

11. A cordless telephone comprising:
   a base unit with an automatic telephone answering and recording subsystem;
   an outgoing message generator;
   a portable unit;
      wherein said base unit has a ring detection circuit to establish an off-hook condition on the telephone line circuit upon receipt of an incoming call from a remote calling party;
      two-way conversation recording means responsive to commands for audio recording;
      a comparator subsystem for receiving pre-stored calling party data and for automatically comparing at least a portion of caller identification information from a calling party to said pre-stored calling party data, and
   a selection switch having at least a first position that when set will, upon detection of a matched condition, automatically activate said two-way conversation recording means.

12. A cordless telephone according to claim 11, further comprising:
   a means for automatically generating a recording-on signal for communication to said called party.

* * * * *